3 Sheets—Sheet 1.

A. E. FEROE.

Assignor to E. C. POTTS.

PROCESS OF MAKING SIRUP AND BEER FROM MAIZE.

No. 10,925. Reissued May 1, 1888.

Witnesses:
Harry King.
[illegible]

Inventor:
Alfred E. Feroe
By his Attorney: Irving Elting.

N. PETERS, Photo-Lithographer, Washington, D. C.

A. E. FEROE.

Assignor to E. C. POTTS.

PROCESS OF MAKING SIRUP AND BEER FROM MAIZE.

No. 10,925. Reissued May 1, 1888.

Witnesses:
Harry King.
[illegible]

Inventor:
Alfred E. Feroe
By his Attorney: Irving Elting.

N. PETERS, Photo-Lithographer, Washington, D. C.

3 Sheets—Sheet 3.

A. E. FEROE.

Assignor to E. C. POTTS.

PROCESS OF MAKING SIRUP AND BEER FROM MAIZE.

No. 10,925. Reissued May 1, 1888.

Witnesses:

Harry King

Inventor:

Alfred E. Feroe

By his Attorney: Irving Elting.

N. PETERS, Photo-Lithographer, Washington, D. C.

UNITED STATES PATENT OFFICE.

ALFRED E. FEROE, OF BOSTON, MASSACHUSETTS, ASSIGNOR TO EDWARD C. POTTS, OF TIVOLI, NEW YORK.

PROCESS OF MAKING SIRUP AND BEER FROM MAIZE.

SPECIFICATION forming part of Reissued Letters Patent No. 10,925, dated May 1, 1888.

Original No. 324,761, dated August 18, 1885. Application for reissue filed April 19, 1886. Serial No. 199,438.

*To all whom it may concern:*

Be it known that I, ALFRED E. FEROE, of Boston, in the county of Suffolk and State of Massachusetts, have invented a new and Improved Process of Making Sirup and Beer from Maize or Indian Corn and Malt, of which the following is a full, clear, and exact description.

The principal object of my invention is to provide a quick, certain, and cheap method of separating all of the insoluble matter in malt and corn mash from the portion that is valuable in making beer and sirup. This has heretofore been impracticable when the proportion of corn to malt has been large and the meal has been subjected to boiling or prepared at any temperature high enough to dissolve the gluten. The meal must be treated at such temperatures to insure a good conversion and large yield.

The present invention is an improvement upon the processes and apparatus described in Patents Nos. 288,619, granted to me August 7, 1883, and 303,141, granted to me August 5, 1884; and it consists in the process hereinafter specified, and also in the apparatus which I make use of in carrying out the process.

Figure 1:
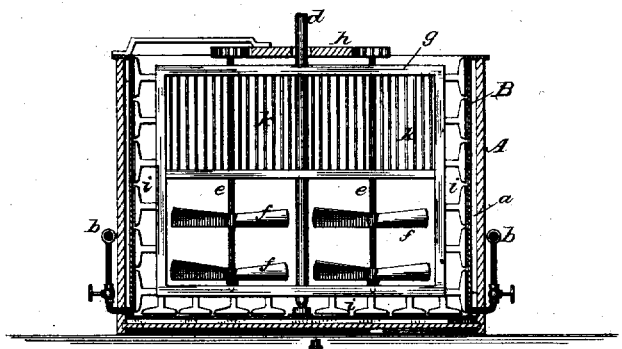
Figure 2:
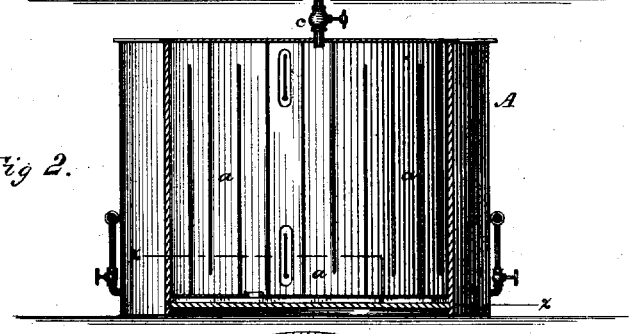
Figure 3:
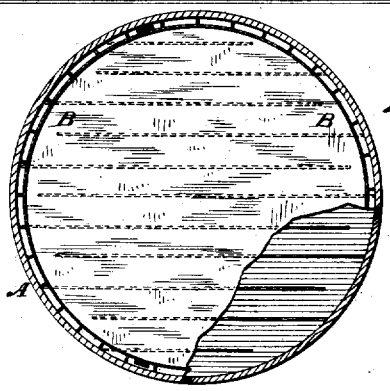
Figure 4:
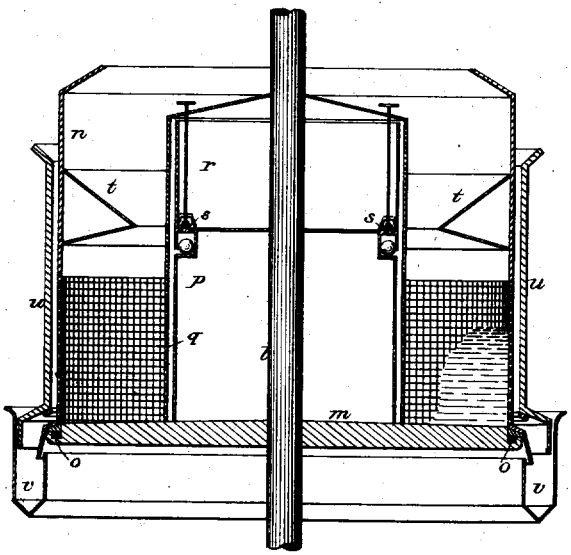
Figure 5:
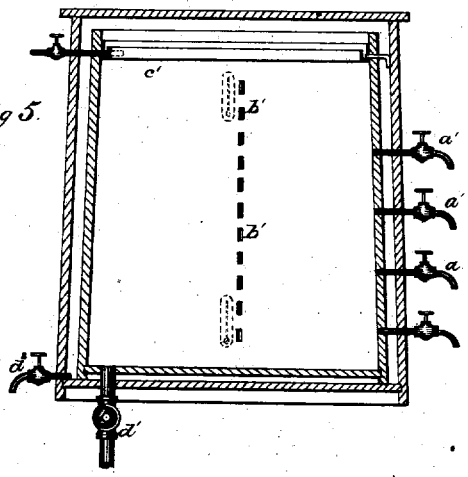
Figure 6:
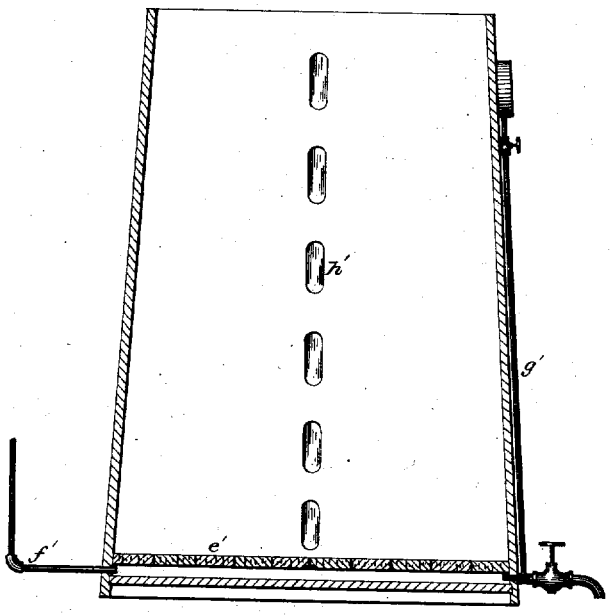

Figure 1 is a sectional elevation of the cooling and cooking vessel. Fig. 2 is a side elevation of the same, partly in section. Fig. 3 is a sectional plan view of the same on the line *x x* in Fig. 2. Fig. 4 is a sectional elevation of the centrifugal separator. Fig. 5 is a sectional elevation of the conversion and settling tub. Fig. 6 is a sectional elevation of the separating-tub.

I will now describe the process and then the parts of the apparatus employed in carrying out the process in detail.

Water, in sufficient quantity to thoroughly saturate the cornmeal—say from thirty-five to forty gallons to each one hundred pounds of meal—is run into the cooking and cooling vessel represented in Figs. 1, 2, and 3 of the drawings. The temperature of the water is to be raised to about 150° Fahrenheit by injecting steam into it through pipes, and while the water is stirred the meal is run in as fast as it will mix. After the meal and water are mixed the temperature is raised to about 155°, and not higher, for the reason that the albuminoids commence to coagulate at about 156°, and that to a certain extent would prevent the water from penetrating to the interior of the larger and harder particles of the meal. The meal is kept at this temperature until thoroughly soaked, which with fine meal will take about an hour, a longer time being required as the meal is coarser or drier. There is then added to the meal from two to four per cent. by weight of finely-granulated malt which has been previously soaked in water of a temperature of about 100° Fahrenheit for twenty or thirty minutes. The temperature of the mixture is then gradually raised (to about 167° Fahrenheit) and continually stirred for about one hour. Then the temperature is raised again to at least 183°, (the temperature at which starch dissolves,) or between that and the boiling-point, (200° Fahrenheit preferred,) and kept at that temperature until the constituents of the meal are rendered as soluble as they can be by this treatment—say from thirty to sixty minutes, according to the fineness of the meal. The mixture is then run into the centrifugal separator, (shown in Fig. 4 of the drawings,) by the operation of which the soluble matter is separated from the insoluble as far as practicable. The remaining contents in the separator are to be sprayed with hot water from the interior tank, (shown in Fig. 4,) and the water will be forced through the meal and sieves of the separator by the centrifugal force, and it will pass to the starch-trough below, carrying with it a portion of the soluble matter in the grains. This spraying may be continued as long as desired. The soluble portions of the meal thus separated, consisting, principally, of starch, dextrine, sugar, salts, and soluble albuminoids, mixed, however, with some fine cellulose and insoluble albuminoids, are now returned to the vessel shown in Figs. 1 and 2 and cooled to any desired temperature for mashing. The malt, having been soaked in water at a temperature of about 100° Fahrenheit for twenty or thirty minutes, is then added and the mash thoroughly stirred and then run into the conversion and settling tub, (shown in Fig. 5,) where it is kept until the conversion is complete.

When a large proportion of sugar is required, nearly all of the dextrine can be converted to sugar by keeping the mash at the proper temperature for several hours, which can easily be done by turning on just sufficient steam for the purpose, and during this operation the insoluble matters of the mash will separate and settle after the conversion takes place, so that most of the wort can be drawn off in a clear condition from above the sediment. This effect is produced by keeping up the temperature of the mash instead of allowing it to cool (as is usually the case) faster at the sides and top than at the bottom and center, which causes a constant circulation in the mash, which effectually prevents the insoluble matters from settling to the bottom. With my apparatus and process the circulation is completely prevented by keeping the wort at an even temperature or at a little higher temperature at the top than below.

After the conversion and settling are completed the clear wort is run off to the boiling-tub or vacuum-pan and boiled until the coagulation is complete, requiring about four hours, and it is then run into the settling-tub, Fig. 5, again, and the temperature kept up, as before, until the coagulated matter settles, after which the clear wort is again run into the vacuum-pan and evaporated to any gravity desired. The remainder of the mash in the conversion-tub after the clear wort is run off is to be put into the centrifugal separator and treated in the same manner as the meal. The liquid portion of it, after it is separated, is cooled down to a temperature of from 50° to 70° Fahrenheit, and the gelatinous part of Irish moss, which has been boiled in water or a solution of isinglass as usually prepared for fining ale, or any other like gelatinous substance, is to be added to it, the whole thoroughly stirred, and then run into the separating-tub, Fig. 6, and submitted to the action of any suitable gas or atmospheric air, preferably carbonic-acid gas under pressure, which is forced through pipes into the space at the bottom of the tub, and thence through the porous false bottom into and up through the liquid. This will have the effect of separating the insoluble and gelatinous matters from the soluble part and carrying them to the surface, where they can be skimmed off, or the clear wort can be run off from underneath. The wort is then to be boiled to coagulate the albuminous matter and treated in the same manner as the wort first drawn until the sirup is finished.

The quantity of Irish moss or other gelatinous substance to be used depends to a great extent on the gravity of the wort, the quantity of insoluble matter in it, the temperature, and the force of the gas passing into and through it. If enough is not used, the gas will pass through the wort without drawing up the insoluble matter. Usually the gelatinous matter from one ounce of good clean Irish moss will be found sufficient for thirty gallons of mash. I prefer Irish moss to the other substances mentioned, for the reason that it is cheaper, easier to prepare, has no deleterious effect upon the sirup, and imparts no flavor to it.

The cooling and cooking vessel shown in Figs. 1, 2, and 3 is constructed as follows: A is an outer wooden tub containing an inner tub, B, of metal, the space between the two tubs being provided with vertical partitions *a*, opened alternately at the top and bottom, so as to insure the circulation around the inner tub of the water supplied by the pipe *c* when the vessel is used for cooling. The inner tub, B, is fitted with a vertical shaft, *d*, and with smaller shafts, *e*, carrying blades or stirrers *f*. The shaft *d* carries a rectangular frame, *g*, in which the two smaller shafts, *e e*, are journaled, and the pinions upon the ends of the shafts *e* gear with the fixed pinion *h* around the shaft *d*, so that when the frame *g* revolves with the shaft *d* the shafts *e* and the stirrers are also set in motion. Upon the bottom and sides of the frame *g* are scrapers *i*, which act to keep the surfaces clean, and the upper part of the frame *g* is fitted with rods or blades *k*, which act to cause the meal to mix thoroughly with the water. Pipe *b* is for supplying steam to heat the water and cook the meal.

The centrifugal separator shown in Fig. 4 is constructed as follows: *l* is a shaft carrying a heavy disk, *m*, that forms the bottom of a hollow cylinder, *n*, the lower portion of which is perforated or formed of perforated material. The lower edge of this cylinder *n* is packed, as shown at *o*, where it is connected with the bottom *m*, so as to make a water-tight joint. *p* is an interior cylinder attached to the bottom *m*, and *q* is another cylinder set off at a short distance from the cylinder *p*, so that there is a space between them for the passage of water into the cylinder *n*, the lower part of the cylinder *q* being perforated for that purpose. The inner cylinder, *p*, is divided by a cross-partition, which forms an upper water-tank, *r*, and *s s* are valves for allowing water to pass from this tank *r* into the space between the two cylinders *p q* for the purpose of sparging the cornmeal, as above described. *t t* are sloping shelves within the cylinder *n*. All of these parts revolve with the shaft.

*u* is an outside tub or cylinder the lower end of which projects into a trough, *v*, that is used for catching the starch passing off when the meal is sparged. The cylinder *u* and the trough *v* are not removable, except when they are raised bodily with the cylinder *n* for the purpose of removing the grain from the bottom *m*.

The conversion and settling tub shown in Fig. 5 consists of the inner and outer tubs, with a space between them, which space is not only around the sides of the inner tub, but extends over said tub (the inner tub having no cover) for steam or hot air, provided with pipe *d'* for admitting steam or hot air to said space and valves *a'* for drawing off the clear wort, thermometers *b'* for indicating the temperature at any point, a trough, $c'$, for catching and carrying off the water of condensation, and the discharge-pipe at $d'$ for emptying the tank.

The separating-tub, Fig. 6, is made with a false bottom, $e'$, forming a space, to which space gas is supplied by a pipe, $f'$, and there is also a pipe, $g'$, from this space to a pressure gage, for indicating the pressure of the gas. The false bottom consists of a frame of iron with the spaces between filled with porous wood that will allow the passage of the gas.

$h'$ are windows to allow observation of the condition of the material.

I am aware that it is not new to soak grain in water at a temperature of about 130° Fahrenheit and then add malt, after which the temperature is raised and the process continued in the usual manner.

I am aware that in order to better convert the starchy portion of corn by malt it has been subjected hitherto to special treatment. Lovibond's method, in common use, consists in putting some malt in with the meal when cooking before it reaches temperatures high enough to destroy the liquefying power of the diastase of malt before making the final conversion. Hatschek's process is similar, but the malt is added to the meal before it is in condition to be much affected by it. I disclaim such points covered by either of these or similar processes. In neither of these processes is the soluble matter of the corn separated from the insoluble before adding the malt to make the final and complete conversion. If the separation described in my patent is not made before the final conversion, a large portion of the starch in the larger particles of corn is not converted, no matter how much malt is used to make the conversion, and the product is not so good, for it contains nearly all of the insoluble fatty acids of the corn which have been dissolved by the diastase of malt used to make the conversion; hence the superiority of my process in requiring less malt to make the conversion, in taking less time, and in producing more sirup of better quality. In brief, therefore, the new features of my process are soaking the meal at temperatures high enough to avoid the danger of souring; to do it quickly; to add a small quantity of malt for liquefying the starch; to constantly stir the mixture so that the diastase of the malt will act on the whole of the starch; to raise the temperature up to the points at which starch dissolves, (from about 183° Fahrenheit to the boiling-point,) and then, after the starch, &c., is thoroughly liquefied and prepared for conversion, to separate the soluble starch, &c., from the insoluble portions before mixing with malt to make the final and complete conversion.

Having thus described my invention, what I claim as new, and desire to secure by Letters Patent, is—

1. The herein-described process for the manufacture of beer-wort and sirup from corn and malt, which consists in soaking the meal in water at a temperature a little below the point at which the albuminoids begin to coagulate; then adding a small percentage of malt; then raising the temperature slowly to the point at which starch dissolves and keeping the meal at this temperature for a sufficient time to render the constituents of the meal as soluble as possible by such treatment; then in a suitable separator separating the soluble portions, fine albuminous matter, &c., from the insoluble portions; then mashing with malt in the usual manner; then running it into a settling and conversion tub suitable for the purpose, keeping the mash at a substantially even temperature, thereby facilitating conversion and settling the fine insoluble matter by keeping the top portions of the mash as warm as or a little warmer than the lower portions; then drawing off the clear wort, boiling the same until coagulation is complete; then running the wort into the settling-tub, settling it as before, and drawing off the clear wort for further treatment, substantially as set forth.

2. In the manufacture of beer-wort and sirup from corn or maize, the herein-described method of making the necessary separation and conversion, which consists in soaking corn-meal in water at a temperature of about 150° Fahrenheit; then raising the temperature nearly to the heats at which the albuminoids begin to coagulate, (about 156° Fahrenheit;) then adding a small percentage of malt; then raising the temperature slowly up to the heats at which starch dissolves, (from about 183° Fahrenheit to the boiling-point;) then separating the starch and other soluble constituents of the meal from the insoluble portions; then mixing with malt to make the conversion, substantially as set forth.

3. In the manufacture of beer-wort and sirup, the herein-described process for liquefying and treating the starch and other soluble constituents of corn preparatory to converting the starch into saccharine extract by mixing it with malt, which consists in mixing a small proportion of malt (sufficient to liquefy the starch but not enough to effect its complete conversion) with the meal after it is softened and expanded by soaking, then raising the temperature of the mixture slowly up to the heats at which starch dissolves, (from 183° Fahrenheit to the boiling-point,) and then separating the starch and other soluble constituents from the insoluble matter before mixing them with malt to make the final and complete conversion, substantially as set forth.

4. In the manufacture of beer-wort and sirup, the herein-described method of treating the residue which remains in the settling-tub after conversion and settling, and after the clear wort, &c., have been drawn off, which consists in separating from the said residue in a suitable separating-machine the liquid portion thereof, cooling the same to a temperature of from 50° to 70° Fahrenheit, and adding thereto Irish moss, gelatine, or other similar substance, as usually prepared for fining beer, thoroughly mixing the same, and in a suitable vessel passing a gas or atmospheric air through it, and after the mass is cleared drawing off, and then treating the clear portion in the same manner as the wort first drawn from the mash, as set forth.

5. The herein-described method of facilitating the settling of the fine insoluble matter of corn and malt mashes during and after conversion, which consists in surrounding the vessel containing the mash or wort on its entire sides and over the upper surface of the mash or wort by a circulating conductor of heat, of the same or a little higher temperature than the contents of the said vessel, substantially as shown and described, whereby the escape of heat from the sides and upper part of the mash or wort and the consequent circulation caused by unequal cooling are prevented, as set forth.

6. The hereinbefore-described process of separating the fine insoluble matters in corn and malt mashes from the extract or wort, which consists in treating it with a solution of Irish moss or gelatine and then subjecting the liquid to the action of gas or air, as specified.

ALFRED E. FEROE.

Witnesses:

THOMAS J. SPROUL,

THEO. PFANNEUSTIEHL.